J. KUNKEL.
SPRING WHEEL.
APPLICATION FILED MAR. 11, 1913.

1,101,293.

Patented June 23, 1914.

2 SHEETS—SHEET 1.

Witnesses
Chas. R. Bealle.
R. L. Jones.

Inventor
J. Kunkel.
By [signature]
Attorney

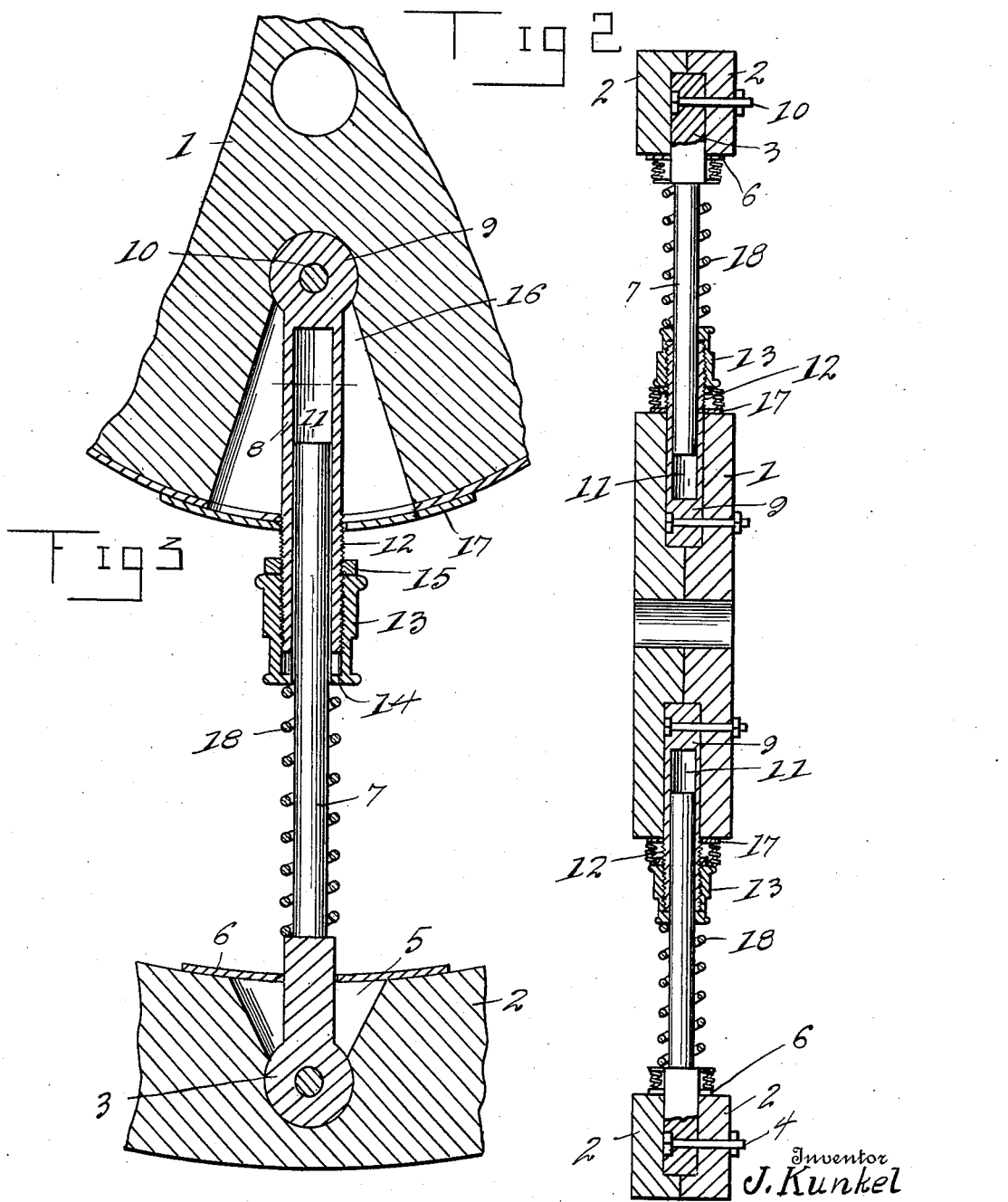

UNITED STATES PATENT OFFICE.

JACOB KUNKEL, OF BROOKVILLE, INDIANA.

SPRING-WHEEL.

1,101,293.　　　　　　Specification of Letters Patent.　　Patented June 23, 1914.

Application filed March 11, 1913.　Serial No. 753,613.

*To all whom it may concern:*

Be it known that I, JACOB KUNKEL, a citizen of the United States, residing at Brookville, in the county of Franklin and State of Indiana, have invented certain new and useful Improvements in Spring-Wheels; and I do hereby declare the following to be a full, clear, and exact description of the invention, such as will enable others skilled in the art to which it appertains to make and use the same.

This invention relates to spring wheels designed for use on trucks or heavy vehicles, and one of the principal objects of the invention is to provide a wheel having a series of yielding spring spokes connected to a rim and to a hub, means being provided for adjusting the tension of the springs.

Another object of the invention is to provide a spring wheel comprising a rim, a series of spokes comprising two telescopic members and a spring surrounding one of these members, the spokes being mounted in recesses in the rim and hub and sliding plates for covering the openings to keep the dust out of the rim and hub.

These and other objects may be attained by means of the construction illustrated in the accompanying drawings, in which:—

Figure 1:
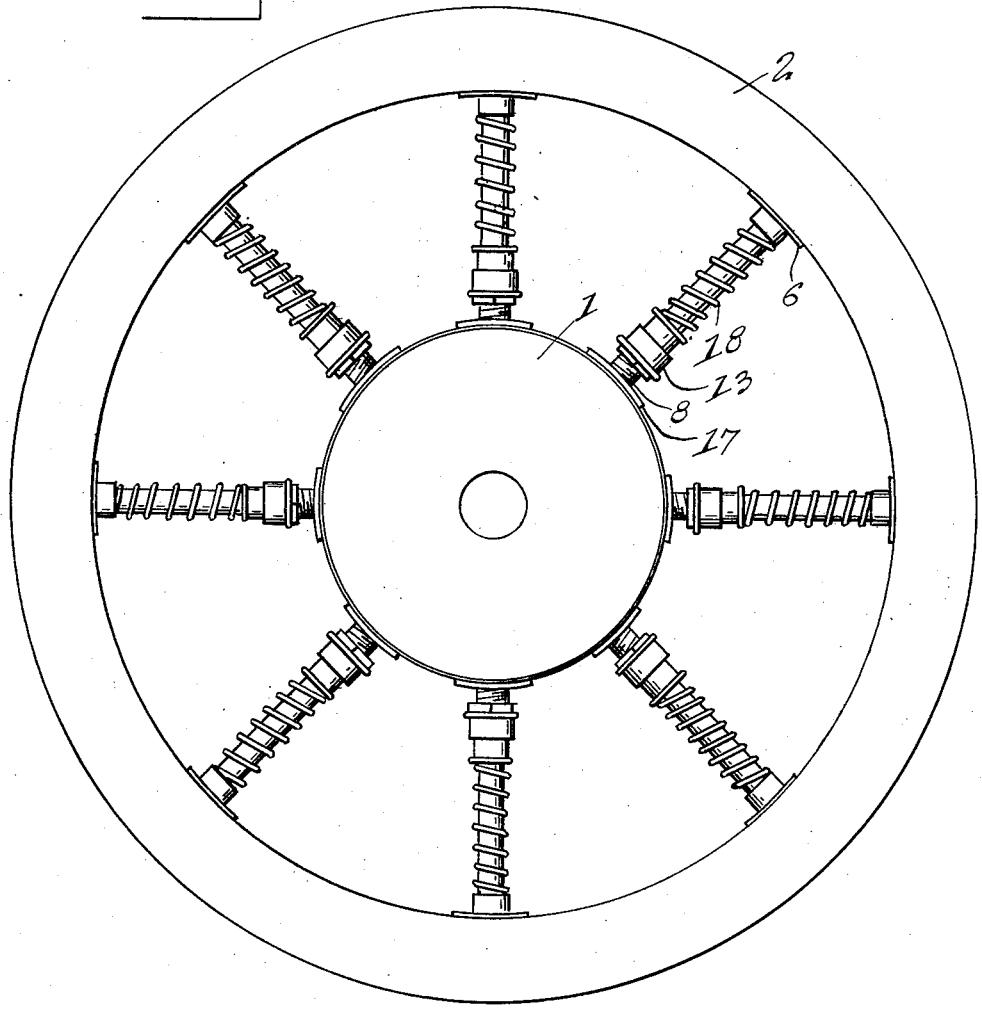
Figure 4:
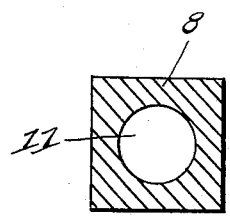

Figure 1 is a side elevation of a spring wheel made in accordance with this invention; Fig. 2 is a central vertical section of the wheel on a larger scale; Fig. 3 is a sectional view taken at right angles to Fig. 2 and showing portions of the rim and hub broken away; Fig. 4 is a sectional view of one of the members of the spoke taken on the line 4—4 of Fig. 3.

Referring to the drawings, the numeral 1 designates the hub and 2 is the rim, said hub and rim each being composed of two members fitted together as shown in Fig. 2 with a space between them for the spokes. The spokes each consist of a flattened and rounded head 3 upon one end fitted into the rim 2 and held in place by means of a bolt 4. The head 3 is flattened and is mounted in a suitable recess 5 in the inner portion of the rim. A plate 6 is connected to the head portion of this member of the spoke and may move laterally with the spoke, said plate being designed to keep the dust out of the recess 5. Extending from the head portion of this member of the spoke is a telescopic member 7 which is designed to slide freely in the hollow member 8 of the spoke. This hollow member is provided with a flattened head 9 secured to the hub by means of the bolt 10. The hollow member 8 is rectangular in cross-section as shown in Fig. 4 and is provided with a central circular bore 11 to accommodate the telescopic member 7. The outer end of the member 8 is screw threaded as at 12 for an adjusting nut 13 said nut having a head portion 14 which is bored to fit the member 7. A lock nut 15 is fitted to the threads 12. The member 8 is mounted in a recess 16 in the head and a sliding plate 17 is mounted on the member 8 over the recess 16 to prevent the dust from getting into the recess 16. Surrounding the telescopic member 7 of each of the spokes is a spiral spring 18, one end of said spring bearing against the head member 3, while the opposite end bears against the head 14 of the adjusting nut 13.

From the foregoing, it will be obvious that any number of spokes may be used and that the tension of the springs may be readily adjusted by the nuts 13, that dust cannot enter the hub or rim owing to the sliding plates 6 and 17 and that the recesses at the sides of the spokes permit a slight lateral movement as the wheels pass over the ground.

The invention is simple in construction, cannot readily get out of order, will yield to the weight of the load placed upon the vehicle and is strong, durable and efficient for its purpose.

I claim:

A spring wheel comprising a hub, consisting of two disks having flaring and rounded bearing recesses in the inner sides thereof, tubular spoke members having rounded ends seated in said rounded bearing recesses, a combined rim and tire consisting of two members having their abutting edges in the peripheral center of the tire portion, said rim having rounded bearing and flaring recesses therein, telescopic spoke members having rounded outer ends seated in said rounded bearing recesses of the rim, said spoke members being pivoted in said rounded bearing recesses, springs surrounding the telescopic spoke members, and a plate connected to each of said spoke members for covering the flaring recesses, said plates being adapted to slide or move during the lateral movement of the spokes for excluding dust from said recesses.

In testimony whereof I affix my signature in presence of two witnesses.

JACOB KUNKEL.

Witnesses:
 JOSEPH VONDERHEIDE,
 JAMES SCHWING.

Copies of this patent may be obtained for five cents each, by addressing the "Commissioner of Patents, Washington, D. C."